No. 762,156. PATENTED JUNE 7, 1904.
J. M. DODGE.
SPROCKET GEARING.
APPLICATION FILED FEB. 4, 1903.
NO MODEL.

Witnesses:-
Hamilton L. Turner
Frank L. A. Graham

Inventor:-
James M. Dodge,
by his Attorneys;
Howson Howson

No. 762,156.

Patented June 7, 1904.

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

SPROCKET-GEARING.

SPECIFICATION forming part of Letters Patent No. 762,156, dated June 7, 1904.

Application filed February 4, 1903. Serial No. 141,869. (No model.)

*To all whom it may concern:*

Be it known that I, JAMES M. DODGE, a citizen of the United States, residing in Philadelphia, Pennsylvania, have invented certain Improvements in Sprocket-Gearing, of which the following is a specification.

The object of my invention is to provide an increased bearing-surface for the links of a detachable-link drive-chain. This object I attain in the following manner, reference being had to the accompanying drawings, in which—

Figure 1:
Figure 2:
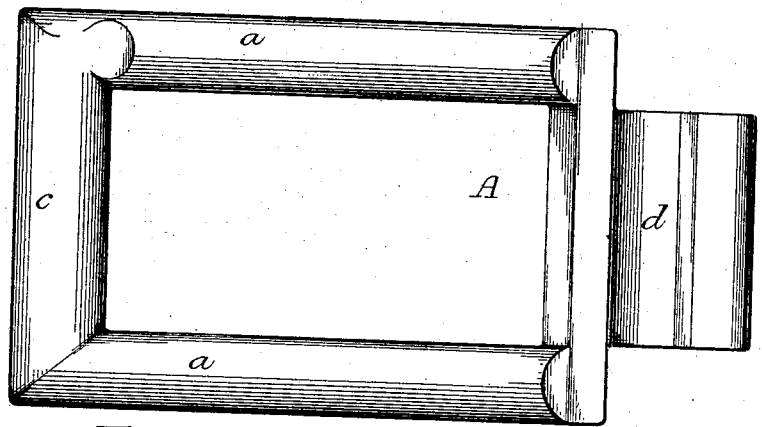
Figure 3:
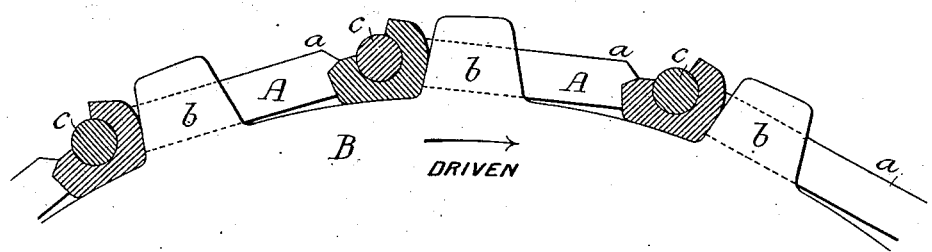
Figure 4:
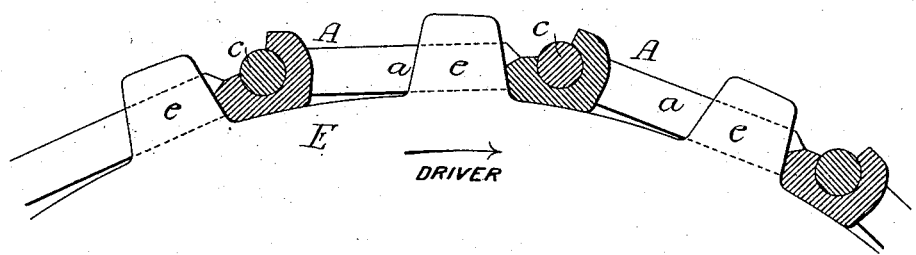

Figure 1 is a longitudinal sectional view of a link, illustrating my invention. Fig. 2 is a plan view of the link shown in Fig. 1. Fig. 3 is a view of a chain in combination with a sprocket-wheel in which the chain is the driver. Fig. 4 is a view similar to Fig. 3 in which the chain is the driven element.

A is a link having side members $a\ a$, and at one end of the link is a pivoted bar $c$ and at the other end a socket $d$, shaped to receive the bar of an adjoining link.

B is a driven wheel having teeth $b$, which are engaged by the chain composed of the links A.

In some instances the pivot-bar may be detachable instead of cast integral with the link, as shown. Usually the exterior surface of the socket $d$ of the link is rounded, so that there is only a line-contact between the link and the tooth of the wheel. This causes the link and tooth to wear rapidly, and, furthermore, there is only a line-contact between the root-surface of the wheel and the socket of the link. By my invention I so shape the exterior surface of the socket as to provide two flat bearing-surfaces $d'$ and $d^2$, the bearing-surface $d'$ being at the end of the link and the bearing-surface $d^2$ being on the under side of the link, so that when a chain composed of my improved links is in engagement with the wheel the flat bearing-surface $d'$ rests against the tooth and the bearing-surface $d^2$ rests against the root-surface of the wheel, the link thus having an extended bearing on both the tooth and the body of the wheel. I also provide a flat bearing-surface $d^3$ on the socket, so that when the chain passes around a driving-wheel, such as in Fig. 4, the teeth $e$ of the wheel E, which is the driver, will bear against the flat surface $d^3$ of the link, while the flat surface $d^2$ will rest against the body of the wheel, as illustrated in the said figure. By this construction I lengthen the life of both the chain and the driving and driven wheels and provide a firm bearing for the chain. When the wheels vary in diameter, the root-base of each wheel should be so shaped as to receive the full bearing of the surface $d^2$ of each link.

I claim as my invention—

1. The combination of a sprocket-wheel having teeth, a drive-chain made up of a series of detachable links, each link having a socket at one end and a bar at the opposite end, the said socket having two flat bearing-faces substantially the full width of the socket, one arranged to contact with the side of the sprocket-tooth and the other to contact with the root-surface of the wheel, substantially as described.

2. The combination of a driving and driven sprocket-wheel, an endless chain made up of a series of detachable links, each link having a bar at one end and a socket at the opposite end, said socket having three flat bearing-surfaces substantially the full width of the socket, one surface arranged to contact with the root-surface of both the driving and the driven wheels, one of the other surfaces arranged to contact with the tooth of the driving-wheel, and the other with the tooth of the driven wheel, substantially as described.

In testimony whereof I have signed my name to this specification in the presence of two subscribing witnesses.

JAMES M. DODGE.

Witnesses:
 WILL. A. BARR,
 JOS. H. KLEIN.